(12) United States Patent
Gai et al.

(10) Patent No.: US 9,625,731 B2
(45) Date of Patent: Apr. 18, 2017

(54) 3D GLASSES AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Xin Gai, Beijing (CN); Chunbing Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 14/435,545

(22) PCT Filed: Jul. 18, 2014

(86) PCT No.: PCT/CN2014/082443
§ 371 (c)(1),
(2) Date: Apr. 14, 2015

(87) PCT Pub. No.: WO2015/154343
PCT Pub. Date: Oct. 15, 2015

(65) Prior Publication Data
US 2016/0252740 A1    Sep. 1, 2016

(30) Foreign Application Priority Data
Apr. 10, 2014  (CN) .......................... 2014 1 0143559

(51) Int. Cl.
*G02F 1/03*    (2006.01)
*G02B 27/22*   (2006.01)
(Continued)

(52) U.S. Cl.
CPC ....... *G02B 27/2264* (2013.01); *G02F 1/0063* (2013.01); *G02F 1/0126* (2013.01)

(58) Field of Classification Search
USPC ................................................ 359/237–249
See application file for complete search history.

(56) References Cited

U.S. PATENT DOCUMENTS 7,154,654 B2 *  12/2006  Kimura ................. G02B 26/02
                                                    359/237
8,237,779 B2    8/2012   Marshall et al.
(Continued)

FOREIGN PATENT DOCUMENTS

CN          1060004 A       4/1992
CN        102782565 A      11/2012
(Continued)

OTHER PUBLICATIONS

Second Chinese Office Action regarding Application No. 201410143559.X dated Jun. 7, 2016. English translation provided by Dragon Intellectual Property Law Firm.
(Continued)

*Primary Examiner* — Mohammed Hasan
(74) *Attorney, Agent, or Firm* — Harness, Dickey & Pierce, P.L.C.

(57) ABSTRACT

The disclosure provides 3D glasses and a display device. The 3D glasses include a frame, a left lens and a right lens. Each of the left lens and the right lens includes a transparent base layer and a light-sensitive material layer. The light-sensitive material layer is in a first state when being irradiated by a light beam with a predetermined characteristic and in a second state when being not irradiated by the light beam with the predetermined characteristic. The first state is one of a light-transmitting state and a light-proof state, and the second state is the other one of the light-transmitting state and the light-proof state.

8 Claims, 1 Drawing Sheet

(51) Int. Cl.
*G02F 1/00* (2006.01)
*G02F 1/01* (2006.01)

(56) References Cited

U.S. PATENT DOCUMENTS

| | | | | |
|---|---|---|---|---|
| 8,564,874 B2* | 10/2013 | Chen | ........................ | G02B 1/06 345/107 |
| 2011/0188107 A1* | 8/2011 | Ward | ................ | G02B 27/2228 359/242 |

FOREIGN PATENT DOCUMENTS

| | | | |
|---|---|---|---|
| CN | 103076682 A | 5/2013 | |
| CN | 202948233 U | 5/2013 | |
| CN | 203909405 U | 10/2014 | |
| DE | 102011009953 A1 | 8/2012 | |
| GB | 1260660 A | 1/1972 | |

OTHER PUBLICATIONS

First Office Action regarding Chinese application No. 201410143559.X, dated Oct. 27, 2015. Translation provided by Dragon Intellectual Property Law Firm.
Written Opinion of the International Searching Authority for international application No. PCT/CN2014/082443, Apr. 14, 2015.

\* cited by examiner though the ITO transparent electrode layers 4 and 5, and the transmittance is also decreased after the light passes through the liquid crystal layer 3. As a result, the 3D glasses having the above structure are of poor transmittance. Moreover, because the 3D glasses are provided with the liquid crystal layer 3 and the ITO electrode layer, which results in a complex manufacturing process and a high production cost. In addition, the 3D glasses have a relatively complex electric circuit due to problems such as polarity reversal of the liquid crystal molecules.

3D GLASSES AND DISPLAY DEVICE

CROSS-REFERENCE TO RELATED APPLICATIONS

This application is the U.S. national phase of PCT Application No. PCT/CN2014/082443 filed on Jul. 18, 2014, which claims a priority to Chinese patent application No. 201410143559.X filed on Apr. 10, 2014, the disclosures of which are incorporated in their entirety by reference herein.

TECHNICAL FIELD

The present disclosure relates to the technical field of three-dimensional (3D) display technology, and in particular, relates to 3D glasses and a display device.

BACKGROUND

The 3D display device is becoming more and more popular in recent years, because it may enable a viewer to observe a stereo image, which is really true to life. However, the viewer can only observe the 3D image, provided by the current 3D display device, by wearing 3D glasses.

The stereo image is achieved with the aid of the 3D glasses, mostly like shutter glasses, which alternately interrupt a left eye image signal and a right eye image signal that are synchronously projected to a screen, so as to observe the stereo image. FIG. 1 is a schematic view showing shutter glasses in the related art. The shutter glasses include a glass substrate 1 and a glass substrate 2 which are arranged opposite, a liquid crystal layer 3 arranged between the glass substrates 1 and 2, and indium tin oxide (ITO) transparent electrode layers 4 and 5 arranged at opposite sides of the liquid crystal layer 3. Then the left eye image signal and the right eye image signal are alternately interrupted by controlling deflection of liquid crystal molecules in the liquid crystal layers 3 of the left and right lenses through the ITO transparent electrode layers 4 and 5, respectively.

Light is absorbed to a certain extent when passing through the ITO transparent electrode layers 4 and 5, and the transmittance is also decreased after the light passes through the liquid crystal layer 3. As a result, the 3D glasses having the above structure are of poor transmittance. Moreover, because the 3D glasses are provided with the liquid crystal layer 3 and the ITO electrode layer, which results in a complex manufacturing process and a high production cost. In addition, the 3D glasses have a relatively complex electric circuit due to problems such as polarity reversal of the liquid crystal molecules.

SUMMARY

An object of the present disclosure is to provide 3D glasses and a display device, so as to improve the transmittance of 3D glasses in the related art, simplify its manufacturing process and lower its production cost.

In one aspect, the present disclosure provides in embodiments three-dimensional (3D) glasses, including a frame, a left lens and a right lens, the left lens and the right lens each including a transparent base layer, wherein each of the left lens and the right lens further includes a light-sensitive material layer, which is in a first state when being irradiated by a light beam with a predetermined characteristic and in a second state when being not irradiated by the light beam with the predetermined characteristic, wherein the first state is one of a light-transmitting state and a light-proof state, and the second state is the other one of the light-transmitting state and the light-proof state.

Alternatively, the light-sensitive material layer is made of a photochromic material, which includes titanium dioxide or zinc oxide nanoparticles-doped bi-bis-diphenylimidazol paracyclophane, or a titanium dioxide or zinc oxide nanoparticles-doped dithienylethene derivative.

Alternatively, the light-sensitive material layer of the left lens is made of the photochromic material different from that of the right lens.

Alternatively, the 3D glasses further include:

a first light source, configured to emit a light beam with a first characteristic, which is at least projected to the left lens, and a second light source, configured to emit a light beam with a second characteristic, which is at least projected to the right lens, wherein the first light source and the second light source work alternately.

Alternatively, the light-sensitive material layer of the left lens is made of the photochromic material, which includes titanium dioxide or zinc oxide nanoparticles-doped bi-bis-diphenylimidazol paracyclophane, the light beam with the first characteristic is of a wavelength of 80 nm to 100 nm, the light-sensitive material layer of the right lens is made of the photochromic material, which includes the titanium dioxide or zinc oxide nanoparticles-doped dithienylethene derivative, and the light beam with the second characteristic is of a wavelength of 790 nm to 820 nm.

Alternatively, the first light source and the second light source are separately arranged at the frame.

Alternatively, the first light source and the second light source are both arranged at a light emitter, and the light emitter is spaced apart from the frame.

Alternatively, the light-sensitive material layer of the left lens is made of the photochromic material identical to that of the right lens.

Alternatively, the 3D glasses further include:

a light source, arranged at the frame and configured to emit the light beam with the predetermined characteristic; and a controller, configured to control the light beam with the predetermined characteristic to be projected to the left lens and the right lens alternately.

Alternatively, the light-sensitive material layer of each of the left lens and the right lens is made of the photochromic material, which includes titanium dioxide or zinc oxide nanoparticles-doped bi-bis-diphenylimidazol paracyclophane, and the light beam with the predetermined characteristic is of a wavelength of 80 nm to 100 nm.

Alternatively, the light-sensitive material layer of each of the left lens and the right lens is made of the photochromic material, which includes the titanium dioxide or zinc oxide nanoparticles-doped dithienylethene derivative, and the light beam with the predetermined characteristic is of a wavelength of 790 nm to 820 nm.

In another aspect, the present disclosure provides in embodiments a 3D display device, which includes a display for outputting a three-dimensional (3D) image and the above-mentioned 3D glasses.

The present disclosure has the following advantageous effects. According to the present disclosure, the 3D glasses may control the left lens and the right lens to be in the light-transmitting state or the light-proof state alternately by means of the light-sensitive material layer capable of being in the light-transmitting state or the light-proof state in accordance with being irradiated by different light beams, which is coated on the transparent base layer, thereby to match the left eye image signal and the right eye image signal outputted from a 3D display. As compared with conventional 3D glasses in the related art, the 3D glasses according to embodiments of the present disclosure is manufactured without using liquid crystal molecules and an ITO electrode material, which results in a simple manufacturing process and a simple electrical circuit, thereby to lower the production cost. Besides, the 3D glasses according to embodiments of the present disclosure are of a higher transmittance and a lighter structure.

DETAILED DESCRIPTION

Figure 1:
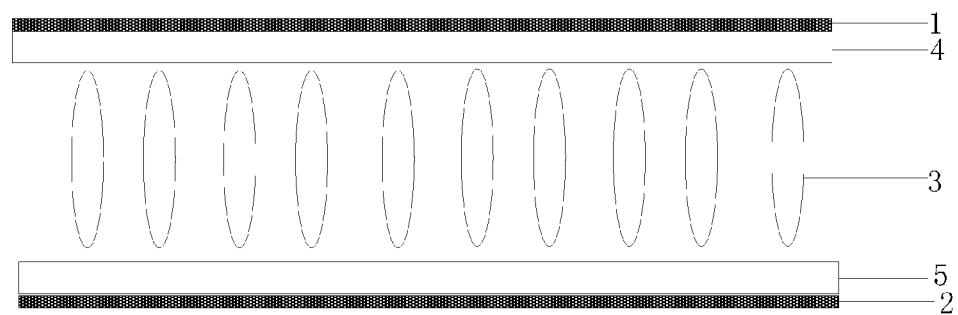
FIG. 1 is a schematic view showing 3D glasses in the related art.

To make the objects, the technical solutions and the advantages of the present disclosure more apparent and clear, detailed descriptions for the technical solutions according to embodiments of the present disclosure are made in conjunction with drawings and specific examples.

According to embodiments of the present disclosure, the 3D glasses include a frame, a left lens and a right lens, the left lens and the right lens each including a transparent base layer, wherein each of the left lens and the right lens further includes a light-sensitive material layer, which is in a first state when being irradiated by a light beam with a predetermined characteristic and in a second state when being not irradiated by the light beam with the predetermined characteristic, and wherein the first state is one of a light-transmitting state and a light-proof state, and the second state is the other one of the light-transmitting state and the light-proof state.

According to an embodiment of the present disclosure, the 3D glasses may control the left lens and the right lens to be in the light-transmitting state or the light-proof state alternately by means of the light-sensitive material layer capable of being in the light-transmitting state or the light-proof state in accordance with being irradiated by different light beams, which is coated on the transparent base layer, thereby to match the left eye image signal and the right eye image signal outputted from a 3D display. As compared with conventional 3D glasses in the related art, the 3D glasses according to embodiments of the present disclosure is manufactured without using liquid crystal molecules and an ITO electrode material, which results in a simple manufacturing process and a simple electrical circuit, thereby to lower the production cost. Besides, the 3D glasses according to embodiments of the present disclosure are of a higher transmittance and a lighter structure.

According to an example of the present disclosure, a material capable of presenting in different colors in accordance with being irradiated by a light beam at different wavelengths, which is coated on the transparent base layer, may be a photochromic material. It may be appreciated by those skilled in the art that the photochromic principle is that: when being irradiated by a light bean at a wavelength of $\lambda 1$, Compound A may turn out to be Compound B being of a different structure and a different spectral characteristic from those of Compound A via a certain chemical reaction; while when being irradiated by a light beam at a wavelength of $\lambda 2$, Compound B may reversibly turn out to be Compound A. Such process is of essential characteristics that Compounds A and B are both stable in a certain condition with a remarkable difference in color presence; and capable of mutual changing reversibly. Based on this principle, the 3D glasses according to embodiments of the present disclosure control the left lens and the right lens to be in the light-transmitting state or the light-proof state alternately via a material layer coated on the transparent base layer, wherein the material layer is made of a photochromic material, which is controlled to be in the light-transmitting state or the light-proof state by means of a light beam at a single wavelength.

For example, the light-sensitive material layer is made of a photochromic material, which includes titanium dioxide or zinc oxide nanoparticles-doped bi-bis-diphenylimidazol paracyclophane (i.e., doped with titanium dioxide or zinc oxide nanoparticles), or a titanium dioxide or zinc oxide nanoparticles-doped dithienylethene derivative (i.e., doped with titanium dioxide or zinc oxide nanoparticles). The photochromic material layer may be made of any material in the prior art, as long as it is suitable for applying the 3D glasses according to embodiments of the present disclosure, such as titanium dioxide or zinc oxide nanoparticles-doped gem-bi-bis-diphenyl imidazol [2.2] paracyclophane, or a photochromic Ir (III) complex formed by directly complexing Ir (III) with thiophene ring of dithienylethene, the titanium dioxide or zinc oxide nanoparticles-doped dithienylethene compound is shown as the following formula:

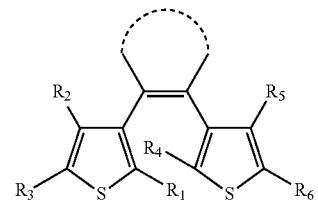

wherein $R_1$, $R_2$, $R_3$, $R_4$, $R_5$ and $R_6$ is independently hydrogen, C1-C6 alkyl or alkenyl.

Example 1

The present disclosure provides in Example 1 3D glasses, which include a frame, a left lens and a right lens, the left lens and the right lens each including a transparent base layer, wherein each of the left lens and the right lens further includes a light-sensitive material layer, the light-sensitive material layer of the left lens is made of the photochromic material different from that of the right lens. For example, the light-sensitive material layer of the left lens is made of a first photochromic material, which is in the light-transparent state when being irradiated by a light beam with a first characteristic and in the light-proof state when being irradiated by a light beam with a second characteristic; the light-sensitive material layer of the right lens is made of a second photochromic material, which is in the light-transparent state when being irradiated by the light beam with the second characteristic and in the light-proof state when being irradiated by the light beam with the first characteristic.

Figure 2:
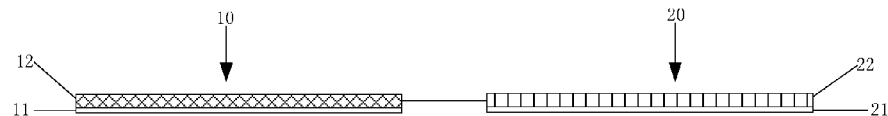
FIG. 2 is a schematic view showing the 3D glasses according to Example 1 of the present disclosure.

FIG. 2 is a schematic view showing the 3D glasses according to Example 1 of the present disclosure. The 3D glasses include the left lens 10 and the right lens 20, wherein the left lens 10 includes a first transparent base layer 11, and the right lens 20 includes a second transparent base layer 21. Specifically, the first transparent base layer 11 and the second transparent base layer 21 may be a glass base layer made of an ordinary spectacle material. Moreover, the left lens 10 further includes a first light-sensitive material layer 12 made of a first photochromic material, which is in the light-transmitting state when being irradiated by the light beam with the first characteristic and in the light-proof state when being irradiated by the light beam with the second characteristic; and the right lens 20 further includes a second light-sensitive material layer 22 made of a second photochromic material, which is in the light-transmitting state when being irradiated by the light beam with the second characteristic and in the light-proof state when being irradiated by the light beam with the first characteristic.

According to the above structure of the 3D glasses, when a 3D display outputs a left eye image signal by a light source which emits the light beam with the first characteristic to the 3D glasses, the first light-sensitive material layer 12 of the left lens 10 is in the light-transmitting state and the second light-sensitive material layer 22 of the right lens 20 is in the light-proof state, as a result, the right lens 20 is impervious to light while the left lens 10 is pervious to light, thereby the left eye image signal can be observed; when the 3D display outputs a right eye image signal by a light source which emits the light beam with the second characteristic to the 3D glasses, the second light-sensitive material layer 22 of the right lens 20 is in the light-transmitting state and the first light-sensitive material layer 12 of the left lens 10 is in the light-proof state, as a result, the left lens 10 is impervious to light and the right lens 20 is pervious to light, thereby the right image signal can be observed. Therefore, the 3D glasses according to Example 1 of the present disclosure may alternately interrupt the left eye image signal and the right eye image signal, so as to achieve the stereo image in coordination with the 3D display.

According to another example of the present disclosure, the first light-sensitive material layer 12 is made of the first photochromic material, which is in the light-proof state when being irradiated by a light beam at a wavelength within a first predetermined range, and in the light-transmitting state when being not irradiated by the light beam at the wavelength within the first predetermined range; the second light-sensitive material layer 22 is made of the second photochromic material, which is in the light-proof state when being irradiated by a light beam at a wavelength within a second predetermined range, and in the light-transmitting state when being not irradiated by the light beam at the wavelength within the second predetermined range.

Namely, the first photochromic material is in the light-proof state when being irradiated by the light beam at the wavelength within the first predetermined range, and in the light-transmitting state when being irradiated by a light beam at other wavelengths; the second photochromic material is in the light-proof state when being irradiated by the light beam at the wavelength within the second predetermined range, and in the light-transmitting state when being irradiated by a light beam at other wavelengths. In this way, when a light beam, emitted from the light source, is of a wavelength within the first predetermined range but not within the second predetermined range, the left lens is in the light-proof state and the right lens is in the light-transmitting state by being irradiated by such light beam; when a light beam, emitted from the light source, is of a wavelength within the second predetermined range but not within the first predetermined range, the left lens is in the light-transmitting state and the right lens is in the light-proof state by being irradiated by such light beam. As such, the left lens and the right lens are in the light-proof state alternately in accordance to being irradiated by the light beam at different wavelengths.

For example, the first photochromic material includes titanium dioxide or zinc oxide nanoparticles-doped bi-bis-diphenylmidazol paracyclophane. During manufacturing the 3D glasses, the first light-sensitive material layer 12 is formed by curing the first photochromic material at a temperature of 100° C. to 130° C. after it is coated on the first transparent base layer 11. Such first photochromic material is in the light-transmitting state when being not irradiated by ultraviolet light, while may present in different colors when being irradiated by ultraviolent light at different wavelengths, for example, the first photochromic material is in the light-proof state when being irradiated by ultraviolent light at a wavelength of 80 nm to 100 nm. The second photochromic material includes the titanium dioxide or zinc oxide nanoparticles-doped dithienylethene derivative. During manufacturing the 3D glasses, the second light-sensitive material layer 22 is formed by curing the second photochromic material at a temperature of 80° C. to 120° C. after it is coated on the second transparent base layer 21. Such second photochromic material is in the light-transmitting state when being not irradiated by infrared light, while may present in different colors when being irradiated by infrared light with different wavelengths, for example, the second photochromic material is in the light-proof state when being irradiated by infrared light at a wavelength of 790 nm to 820 nm.

Therefore, when the first photochromic material includes titanium dioxide or zinc oxide nanoparticles-doped bi-bis-diphenylmidazol paracyclophane and the second photochromic material includes the titanium dioxide or zinc oxide nanoparticles-doped dithienylethene derivative, the light beam with the first characteristic is infrared light and the light beam with the second characteristic is ultraviolet light, and the first predetermined range of the wavelength is from 80 nm to 100 nm and the second predetermined range of the wavelength is from 790 nm to 820 nm.

The above-mentioned 3D glasses according to Example 1 are an example for illustrating embodiments of the present disclosure, but not intended to limit the present disclosure. In some other examples of the present disclosure, the first light-sensitive material layer and the second light-sensitive material layer may also be made of a photochromic material, which is in the light-transmitting state when being irradiated by a light beam at a wavelength within a predetermined range, and in the light-proof state when being not irradiated by the light beam at the wavelength within the predetermined range, respectively.

According to embodiments of the present disclosure, the light source for providing the light beam at the wavelength within the predetermined range may be arranged at a display, or may also be arranged at anywhere of the 3D glasses which is spaced apart from the display, as long as the light source may emit the light beam capable of irradiating to the 3D glasses. Moreover, the light source may be arranged at the 3D glasses at the lens side, in this case, the 3D glasses further include:

a first light source, configured to emit a light beam with a first characteristic, which is at least projected to the left lens, and a second light source, configured to emit a light beam with a second characteristic, which is at least projected to the right lens, wherein the first light source and the second light source work alternately, in accordance with the left eye image signal or the right eye image signal outputted.

The first light source and the second light source may be separately arranged at the frame, or may be both arranged at a light emitter, which is spaced apart from the frame.

Example 2

The present disclosure further provides in Example 2 3D glasses, which include a frame, a left lens and a right lens, the left lens and the right lens each including a transparent base layer, wherein each of the left lens and the right lens further includes a light-sensitive material layer, the light-sensitive material layer of the left lens is made of the photochromic material identical to that of the right lens.

According to an example of the present disclosure, the 3D glasses further include:

a light source, arranged at the frame and configured to emit the light beam with the predetermined characteristic; and a controller, configured to control the light beam with the predetermined characteristic to be projected to the left lens and the right lens alternately.

Figure 3:
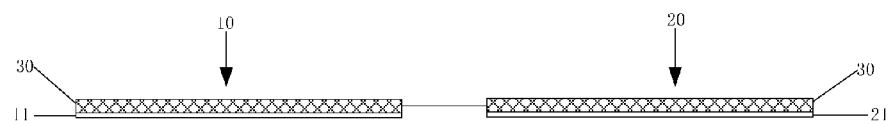
FIG. 3 is a schematic view showing the 3D glasses according to Example 2 of the present disclosure.

FIG. 3 is a schematic view showing the 3D glasses according to Example 2. In the present example, as the same in Example 1, the left lens 10 includes a first transparent base layer 11, and the right lens 20 includes a second transparent base layer 21. Being different from that in Example 1, a third light-sensitive material layer 30, which is in the first state when being irradiated by a light beam with a predetermined characteristic and in the second state when being not irradiated by the light beam with the predetermined characteristic, is arranged at each of the first transparent base layer 11 and the second transparent base layer 21, wherein the first state is one of a light-transmitting state and a light-proof state, and the second state is the other one of the light-transmitting state and the light-proof state.

In addition, the 3D glasses according to the present example further include a light source, configured to emit the light beam with the predetermined characteristic, and then project the light beam with the predetermined characteristic to the left lens and the right lens alternately.

For example, the third light-sensitive material layers 30 is in the light-transmitting state (the first state) when being irradiated by the light beam with the predetermine characteristic, and in the light-proof state (the second state) when being not irradiated by the light beam with the predetermine characteristic. When the light beam with the predetermined characteristic is projected to the left lens 10, the third light-sensitive material layers 30 of the left lens 10 is in the light-transmitting state, while the third light-sensitive material layers 30 of the right lens 20 is in the light-proof state due to being not irradiated by the light beam with the predetermined characteristic. When the light beam with the predetermined characteristic is projected to the right lens 20, the third light-sensitive material layers 30 of the right lens 20 is in the light-transmitting state, while the third light-sensitive material layers 30 of the left lens 10 is in the light-proof state due to being not irradiated by the light beam with the predetermined characteristic. Therefore, the 3D glasses according to Example 2 of the present disclosure may alternately interrupt the left eye image signal and the right eye image signal, so as to achieve the stereo image in coordination with the 3D display.

According to another implementation of Example 2, the third light-sensitive material layer 30 is in the light-proof state (the first state) when being irradiated by the light beam with the predetermined characteristic, and in the light-transmitting state (the second state) when being not irradiated by the light beam with the predetermined characteristic. When the light beam with the predetermined characteristic is projected to the left lens 10, the third light-sensitive material layer 30 of the left lens 10 is in the light-proof state, while the third light-sensitive material layer 30 of the right lens 20 is in the light-transmitting state due to being not irradiated by the light beam with the predetermined characteristic. When the light beam with the predetermined characteristic is projected to the right lens 20, the third light-sensitive material layer 30 of the right lens 20 is in the light-proof state, while the third light-sensitive material layer 30 of the left lens 10 is in the light-transmitting state due to being not irradiated by the light beam with the predetermined characteristic. Therefore, the 3D glasses according to Example 2 of the present disclosure may alternately interrupt the left eye image signal and the right eye image signal, so as to achieve the stereo image in coordination with the 3D display.

For example, the third light-sensitive material layer is made of a third photochromic material, which includes titanium dioxide or zinc oxide nanoparticles-doped bi-bis-diphenylimidazol paracyclophane. During manufacturing the 3D glasses, the third light-sensitive material layer 30 is formed by curing the third photochromic material at a temperature of 100° C. to 130° C. after it is coated on the first transparent base layer 11. Such third photochromic material is in the light-transmitting state when being not irradiated by ultraviolet light, while may present in different colors when being irradiated by ultraviolent light at different wavelengths, for example, the third photochromic material is in the light-proof state when being irradiated by ultraviolent light at a wavelength of 80 nm to 100 nm, i.e., the light beam with the predetermined characteristic is of a wavelength within 80 nm to 100 nm. For another example, the third light-sensitive material layer is made of a third photochromic material, which includes the titanium dioxide or zinc oxide nanoparticles-doped dithienylethene derivative. During manufacturing the 3D glasses, the third light-sensitive material layer 30 is formed by curing the third photochromic material at a temperature of 80° C. to 120° C. after it is coated on the second transparent base layer 21. Such second photochromic material is in the light-transmitting state when being not irradiated by infrared light, while may present in different colors when being irradiated by infrared light with different wavelengths, for example, the third photochromic material is in the light-proof state when being irradiated by infrared light at a wavelength of 790 nm to 820 nm, i.e., the light beam with the predetermined characteristic is of a wavelength within 790 nm to 820 nm.

According to an example of the present disclosure, for the 3D glasses according to Example 2 of the present disclosure, the light source for emitting a light beam at a third wavelength is arranged at the frame of the 3D glasses. Further, when two light sources are separately arranged at the frame, the 3D glasses include:

a first light source, configured to emit the light beam with the predetermined characteristic which is projected to the left lens;

a second light source, configured to emit the light beam with the predetermined characteristic which is projected to the right lens; and a controller, configured to control the first light source and the second light source to be projected to the left lens and the right lens alternately.

Certainly, the structure of the light source is not limited to the above-mentioned structures, it may also achieved in other ways, as long as the light beam with the predetermined characteristic can be projected to the left lens and the right lens alternately.

According to another embodiment of the present disclosure, there provides a display device, which includes a display for outputting a three-dimensional (3D) image, a light emitter and 3D glasses. The structure of the 3D glasses may refer to the above description, and thus is not described again herein. As compared with conventional 3D glasses in the prior art, the 3D glasses and the display device according to embodiments of the present disclosure are manufactured without using liquid crystal molecules and the ITO electrode material, which results in a simple manufacturing process and a simple electrical circuit, thereby lower the production cost. Besides, the 3D glasses according to embodiments of the present disclosure are of a higher transmittance and a lighter structure.

The above are merely the preferred embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. Three-dimensional (3D) glasses, comprising a frame, a left lens and a right lens, the left lens and the right lens each comprising a transparent base layer,
   wherein each of the left lens and the right lens further comprises a light-sensitive material layer, which is in a first state when being irradiated by a light beam with a predetermined characteristic and in a second state when being not irradiated by the light beam with the predetermined characteristic,
   wherein the first state is one of a light-transmitting state and a light-proof state, and the second state is the other one of the light-transmitting state and the light-proof state, and the light-sensitive material layer of the left lens is made of a photochromic material identical to that of the right lens.

2. The 3D glasses according to claim 1, wherein the photochromic material comprises titanium dioxide or zinc oxide nanoparticles-doped bi-bis-diphenylimidazol paracyclophane, or a titanium dioxide or zinc oxide nanoparticles-doped dithienylethene derivative.

3. The 3D glasses according to claim 1, further comprising:
   a light source, arranged at the frame and configured to emit the light beam with the predetermined characteristic; and
   a controller, configured to control the light beam with the predetermined characteristic to be projected to the left lens and the right lens alternately.

4. The 3D glasses according to claim 3, wherein the light-sensitive material layer of each of the left lens and the right lens is made of the photochromic material, which comprises titanium dioxide or zinc oxide nanoparticles-doped bi-bis-diphenylimidazol paracyclophane, and the light beam with the predetermined characteristic is of a wavelength of 80 nm to 100 nm.

5. The 3D glasses according to claim 3, wherein the light-sensitive material layer of each of the left lens and the right lens is made of the photochromic material, which comprises the titanium dioxide or zinc oxide nanoparticles-doped dithienylethene derivative, and the light beam with the predetermined characteristic is of a wavelength of 790 nm to 820 nm.

6. A display device, comprising a display for outputting a three-dimensional (3D) image, and the 3D glasses according to claim 1.

7. The display device according to claim 6, wherein photochromic material comprises titanium dioxide or zinc oxide nanoparticles-doped bi-bis-diphenylimidazol paracyclophane, or a titanium dioxide or zinc oxide nanoparticles-doped dithienylethene derivative.

8. The display device according to claim 6, wherein the 3D glasses further comprise:
   a light source, arranged at the frame and configured to emit the light beam with the predetermined characteristic; and
   a controller, configured to control the light beam with the predetermined characteristic to be projected to the left lens and the right lens alternately.

* * * * *